United States Patent [19]

Lamb

[11] 4,338,738
[45] Jul. 13, 1982

[54] SLIDE PREVIEWER AND TRAY LOADER

[76] Inventor: Owen L. Lamb, 662 W. Sunnyoaks Ave., Campbell, Calif. 95008

[21] Appl. No.: 110,804

[22] Filed: Jan. 10, 1980

[51] Int. Cl.$^3$ ............................................. G09F 11/30
[52] U.S. Cl. ........................................ 40/509; 40/476
[58] Field of Search ................ 40/361, 366, 367, 476, 40/508, 509, 511; 353/21

[56] References Cited

U.S. PATENT DOCUMENTS

| | | | |
|---|---|---|---|
| 2,401,506 | 6/1946 | Perchkranz | 40/508 |
| 3,527,530 | 9/1970 | Hughes | 40/367 X |
| 3,556,650 | 1/1971 | Pennock | 353/21 |
| 3,591,275 | 7/1971 | Badalich | 353/21 |

FOREIGN PATENT DOCUMENTS 14750 of 1913 United Kingdom ................. 40/476

Primary Examiner—Gene Mancene
Assistant Examiner—Wenceslao J. Contreras
Attorney, Agent, or Firm—Owen L. Lamb

[57] ABSTRACT

A slide previewer/tray loader having a holder which is adapted to receive a photographic slide at one end thereof. The holder is initially positioned at an angle above horizontal so that the slide will drop into the holder by force of gravity. When in the initial position, the slide in the holder is illuminated by a back light so that the slide can be previewed and edited. The holder pivots in such a manner that the slide can be moved to a vertical position over a slide tray slot. Means are provided to restrain the slide in the holder during transit from the initial viewing position to the position over the slide tray slot. The restraining means releases the slide to allow it to drop into the tray slot.

9 Claims, 8 Drawing Figures

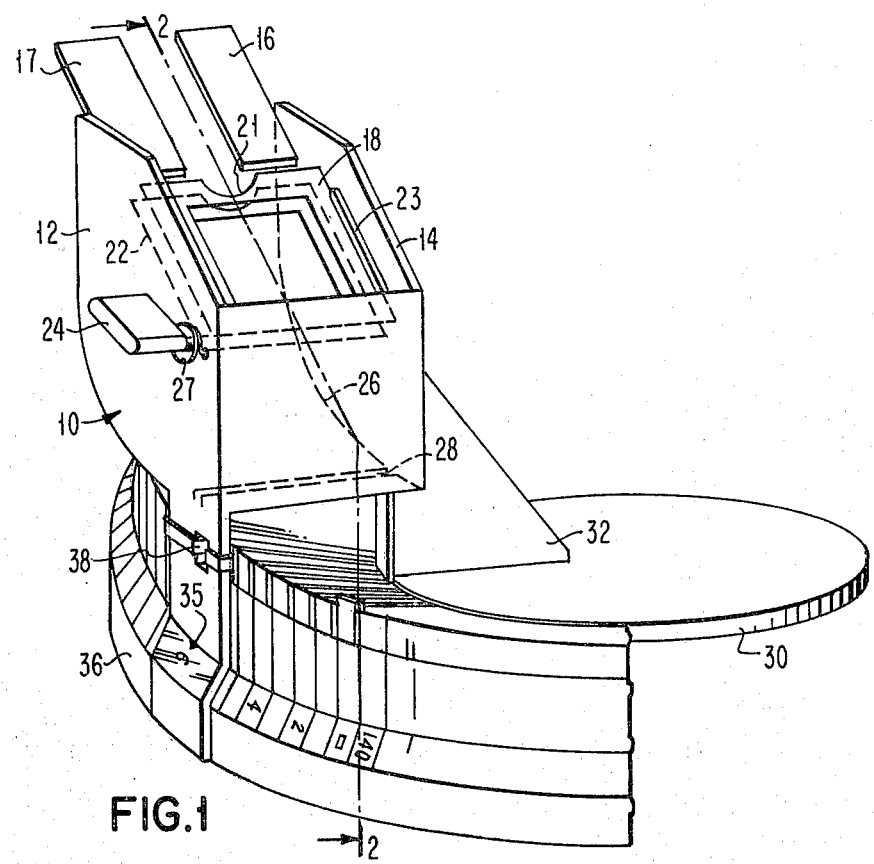
FIG.1
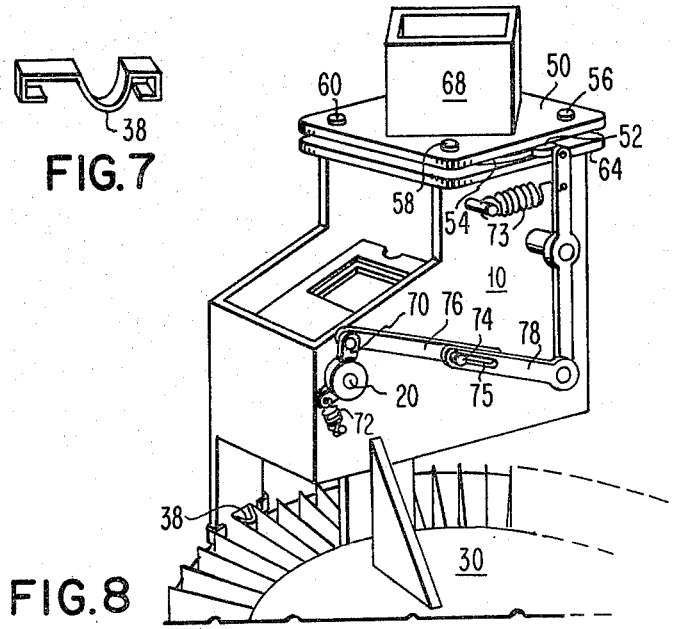
FIG.7
FIG.8

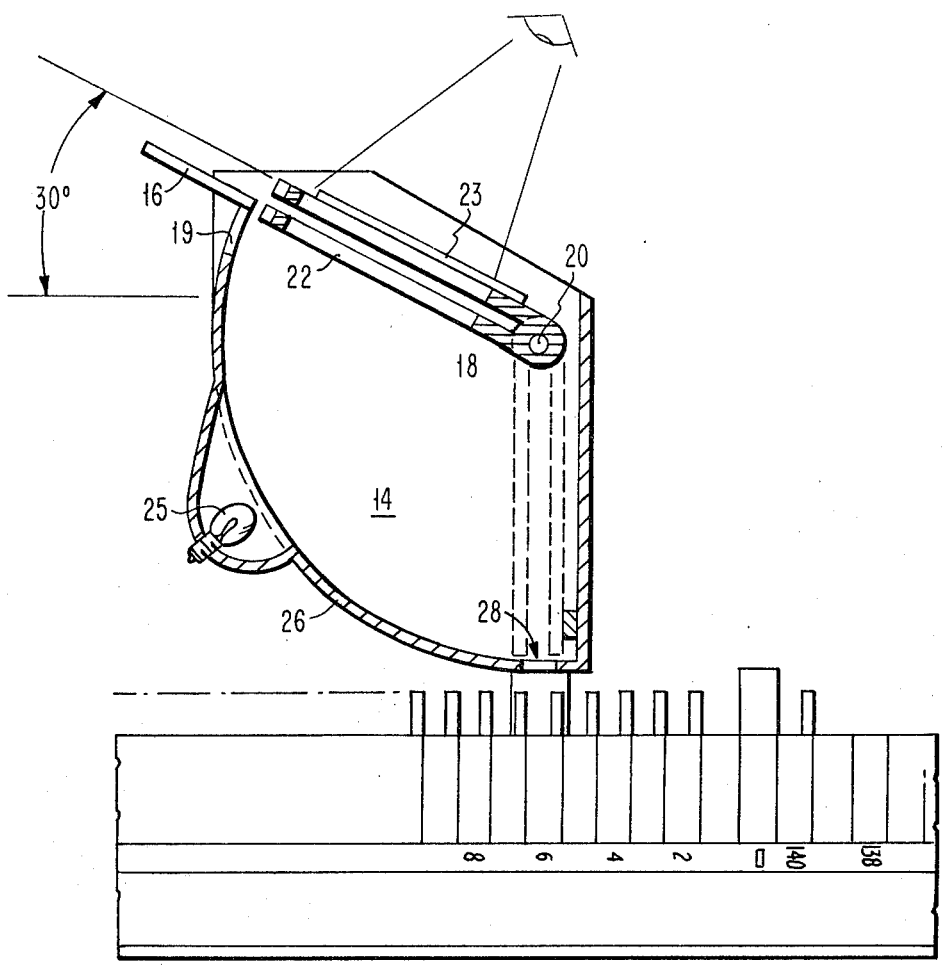
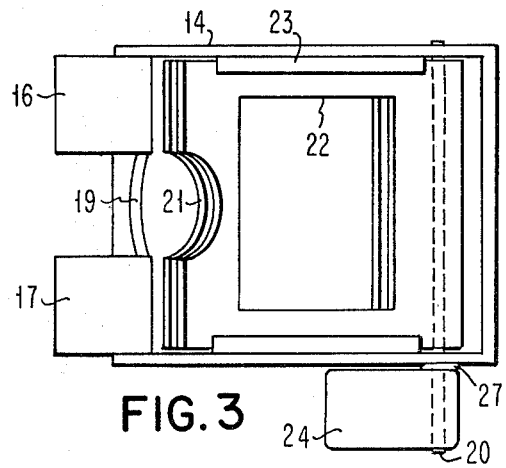
FIG.2
FIG.3

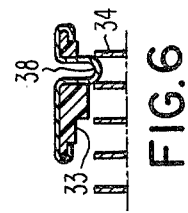
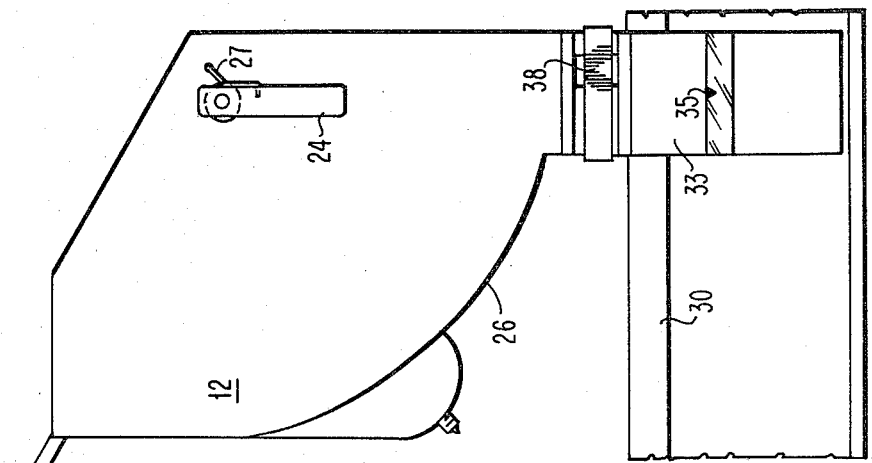
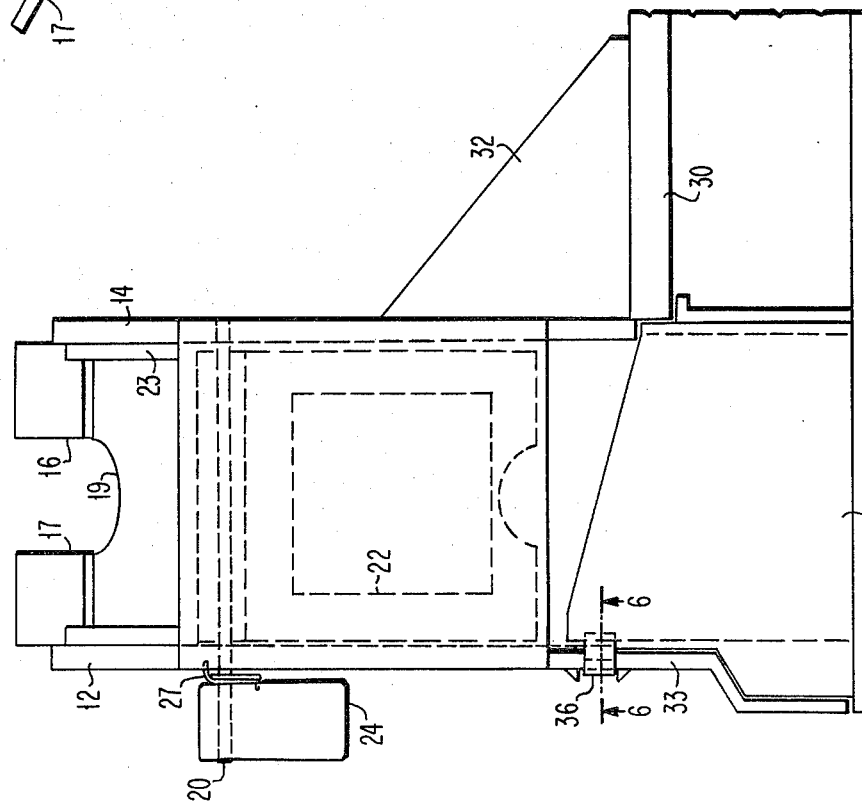

SLIDE PREVIEWER AND TRAY LOADER

BACKGROUND OF THE INVENTION

The present invention relates to apparatus for previewing and editing photographic slides prior to projection, and more particularly, to an apparatus for loading a slide tray of the type which is used in slide projectors.

Several types of modern photographic slide projectors utilize slide trays. The slide trays are generally made of plastic with spaced compartments for holding individual slides. During projection the slides in the compartments are sequentially removed from the compartment by the slide projector mechanism and transported inside the projector for projection. After projection, the slide is transferred back to the tray and the next sequential slide is selected.

Slide trays may be either linear or circular in shape. For example, a gravity-fed projector utilizing a circular rotating slide tray is shown in the Robinson U.S. Pat. No. 3,276,314. Slides are placed into the tray from above. Slides are dropped into the projector through a slot from below by force of gravity and by means of an arm which lowers the slide through the slot into the projector. After projection, the arm moves the slide up through the slot and the entire circular tray is rotated so that the next slide is positioned over the slot.

When sorting, editing, and viewing slides, photographers generally use a large, back-lighted diffusing screen made of opaque plastic or ground glass. The slides are placed on the screen and viewed by means of a hand-held magnifying glass. Slides can then be sorted on the screen and arranged in a desired sequence. The slides are then manually picked up and placed into the slide compartments of the slide tray in the appropriate sequence. This method is cumbersome and time-consuming.

It is an object of the present invention to provide a slide-previewing device which can be used to preview slides and automatically load a slide tray.

It is a further object of this invention to provide a slide previewer and tray loader which operates by force of gravity, thereby eliminating the need for complicated mechanisms.

It is a further object of this invention to provide a slide-previewing device and tray loader in which the slides can be viewed by a magnifying lens.

Briefly, the above objects are accomplished in accordance with the invention by providing means for holding a photographic slide in a first-viewing position at an angle to the horizontal plane. Means are provided for rotating the holding means in the vertical plane to a second position above a slide compartment in a photographic slide tray. Restraining means restrain the slide in the holding means. The restraining means is adapted to release the slide from the holding means upon the condition that the holding means is in the second position, whereby the slide is allowed to drop by force of gravity into the slide compartment of a photographic slide tray.

In accordance with an aspect of the invention, the apparatus is provided with a chute oriented on an incline to horizontal which is adapted to receive a slide at one end thereof. The other end of the chute is positioned in alignment with the holding means when the holding means is in position for viewing. Thus, a slide dropped onto the chute slides by force of gravity into said holding means.

The invention has the advantage that it contains very few moving parts, relying mainly on the force of gravity to drop the slides into the tray.

BRIEF DESCRIPTION OF THE DRAWINGS

The foregoing and other objects, features, and advantages of the invention will be apparent from the following detailed description of preferred embodiments of the invention as illustrated in the accompanying drawings wherein:

FIG. 1 is a perspective view of one embodiment of the invention;

FIG. 2 is a vertical section taken through the slide viewer as indicated by Line 2—2 of FIG. 1;

FIG. 3 is a top view of the slide tray loader of FIG. 1;

FIG. 4 is a front view of the slide tray loader of FIG. 1;

FIG. 5 is a left-side view of the slide tray loader of FIG. 1;

FIG. 6 is a sectional view of the slide tray loader of FIG. 1 taken through the slide viewer as indicated by Line 6—6 shown in FIGS. 4 and 5;

FIG. 7 is a perspective view of the indexing spring shown in FIG. 1; and,

FIG. 8 is a perspective view of a second embodiment of the invention.

DESCRIPTION

The slide previewer/tray loader is shown in FIG. 1 and in cross-section along the view lines 2—2 in FIG. 2.

The previewer/tray loader has a housing (10) made of a structural material, such as a relatively stiff sheet plastic glued together to form a frame. Within the two walls (12 and 14) of the frame, there is an inclined chute (16) set at an angle, for example, 30 degrees, with the horizontal.

At the lower end of the chute there is provided a slide holder (18), which is U-shaped and is rotatably mounted by means of a pin (20), which passes through holes in the wall portions (12 and 14).

The slide holder (18) may be made out of transparent plastic, or it may have a window (22) cut therein to form a viewing station through which light from a light source (25) can pass to illuminate a transparency placed in the holder.

A coil spring (21) is provided to urge the lever (24) in a clockwise direction to thus maintain the slide holder (18) against the limit stop (23) so that it is normally held in the preview position.

A curved slide-restraining portion (26) is provided with a slot (28) at the lower end thereof.

The upper part of the frame (10) is secured to a circular support (30) by means of a brace portion (32) attached to the inner wall (14). The outer wall (12) is extended to form a foot portion (34) which is shaped to the contour of the outer periphery of the slide tray (36). This foot portion may be constructed of a transparent plastic material with an index mark (35) provided thereon as shown in FIG. 5, so that the numbers on the slide tray opposite the index mark can be read. An opening is cut in the foot portion (34) so that a detent spring can pass therethrough. This spring is provided with a U-shaped portion (38) which engages two walls of an individual slide compartment of the tray (36) such that the slot (28) is held in position directly above the slide compartment. When so positioned, a slide in the holder (18) will drop through the slot (28) into the individual slide compartment when the holder is moved to the vertical position shown by the dotted lines in FIG. 2.

In order to view a number of slides, edit them, and load them into separate bins in a slide tray, the slide is first dropped onto the chute (16, 17), either manually or automatically from a slide hopper (68). The slide travels down the chute by force of gravity into the holder (18). The slide may be removed from the holder manually and reoriented or removed for editing by gripping the portion of the slide that protrudes from the cutout portion (21) in the holder. After viewing, the slide may be dropped into a slide compartment located opposite the index mark (35) by depressing the lever (24) which causes the holder (18) to move to the vertical position. The slide drops through the opening (28) by force of gravity and into the empty slide tray compartment. The sequential order of slides may be varied by moving the index point (35) to the empty compartment in which it is desired to place the slide.

The lever (24), when released, allows the force of the coil spring (27) to return the lever to its initial position.

Referring now to FIG. 8, the slide previewer and tray loader shown in FIG. 1 may be equipped with a slide hopper (68) which allows slides to be dropped automatically, one-by-one, onto the chute (16). This mechanism is more fully described in U.S. Pat. No. 4,249,329, which issued on Feb. 10, 1981, entitled "Apparatus for Viewing and Sorting Photographic Slide Transparencies," to Owen L. Lamb. Briefly, the operation is as follows. Slides are placed in the hopper (68). The hopper (68) is oriented at an angle of 45 degrees to the slide chute (16). The lower portion (52) has an opening cut therein large enough to admit a slide, and in alignment with the chute (16).

The slide carrier (54) has a similar opening cut therein. When in the load position (with the arm, 64, against limit-stop, 58), this opening is in alignment with the hopper (68) so that a slide in the hopper is able to drop by force of gravity into the opening of the carrier (54). However, the slide is restrained from dropping into the chute (16) by the lower portion (52). This is illustrated more clearly in the above-identified copending patent application, FIGS. 5–7.

As the slide carrier arm (64) is rotated counterclockwise, the single slide in the carrier is rotated in the same direction. The slide is unloaded and drops into the chute (16) when the arm (64) reaches limit-stop (56). This is because the opening in the slide carrier (54) becomes aligned with the opening in the lower portion (52), thus allowing the slide to drop therethrough.

The slide holder (18) is held in the position shown, in alignment with the chute (16) by means of spring 72, which exerts tension on the arm (70), which is fastened to the pivot pin (20). The arm (70) is connected through a linkage to the carrier arm (64) so that the carrier is normally held against the limit-stop (56). The spring (73) exerts a force on carrier arm (64) tending to urge the carrier toward limit-stop 58. However, the force of spring 73 is insufficient to overcome the countervailing force of spring 72.

A link (76) has a pin (74) connected thereto. The pin (74) engages a slot (75) in another link (78). When the arm (70) is rotated in the direction of the arrow, the pin (74), moves in the slot (75), thus releasing force on the link (78). The spring (73) forces the carrier arm (64) to limit-stop, 58. In this position, a slide drops into the carrier. When the arm (70) is released, it returns to the position shown in FIG. 8, and the slide carrier arm is forced against limit-stop 56 through the action of pin 74, against the end of slot 75. The slide in the carrier now drops into the chute (16) where it slides by force of gravity into the slide holder (18). The slide can now be viewed, and removed for editing.

A slide in the holder (16) can be loaded into the tray (36) by again rotating arm 70 in the direction of the arrow. The slide in the holder will drop into the tray (36) when the holder reaches the vertical position. The next slide in the hopper (68) will drop into the slide carrier because the carrier arm will have been released to move to limit-stop 58. The slide will not, however, drop into chute 16 until the arm (72) and holder (18) are allowed to return to the initial position, at which time the carrier arm (64) will be forced back to limit-stop 56.

The slide holder (18) shown in the various figures is pivotally mounted at one end by means of a pin (20). It will be understood by those skilled in the art that the holder can be pivoted at any point so long as the pin does not interfere with the slide in the holder. For example, if the pivot point were at the center of the holder, the arc of the restraining means (26) would have a radius of one-half that shown in FIG. 2. The size of the entire mechanism can then be reduced accordingly.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A slide-handling mechanism comprising:
    means for holding a slide;
    means for moving said holding means in the vertical plane from a first position to a vertical position;
    means for restraining said slide in said holding means, including means for allowing said slide to drop from said holding means when said holding means is in said vertical position; and,
    means for registering said slide-handling mechanism above a slide compartment of a slide tray, such that a slide in said holding means is allowed to drop into said compartment when said holding means is in said vertical position.

2. The slide mechanism in accordance with claim 1 wherein said slide tray is provided with a plurality of slide compartments and wherein said means for registering said slide-handling mechanism above a slide compartment of said slide tray, includes means for allowing relative motion between said slide tray and said slide-handling mechanism so that said slide-handling mechanism may be registered above any one compartment of said plurality of compartments, whereby a slide in said holding means is allowed to drop into said one compartment when said holding means is in said vertical position.

3. The combination in accordance with claim 1 further comprising:
    a chute oriented at an incline to horizontal adapted to receive a photographic slide, for providing a passage through which said slide may pass from an upper end of said chute to a lower end of said chute by force of gravity, said chute being located with respect to said holding means such that the lower end of said chute is in alignment with said holding means when said holding means is in said first position;

whereby a slide placed in said chute at the upper end thereof drops by force of gravity to the lower end of said chute where said slide exits from said chute and into said holding means.

4. The combination in accordance with claim 1 or claim 3 wherein said slide tray is provided with a plurality of slide compartments and wherein said means for registering said slide-handling mechanism above a slide compartment of a slide tray includes means for indexing said slide-handling means to a particular slide compartment above which it is desired to register said slide-handling mechanism.

5. The combination in accordance with claim 3 further comprising:

means located above said upper end of said chute for dropping slides, one by one, onto said chute at said upper end thereof.

6. The combination in accordance with claim 5 wherein said slide tray is provided with a plurality of slide compartments and wherein said means for registering said slide-handling mechanism above a slide compartment of a slide tray includes means for indexing said slide-handling means to a particular slide compartment above which it is desired to register said slide-handling mechanism.

7. The combination in accordance with claim 5 further comprising:

first means for activating said means for moving said holding means to place said holding means in said first position; and, second means for activating said slide-dropping means to thereby drop a slide onto said chute;

whereby a slide in said slide-dropping means is dropped onto said chute, where it drops by force of gravity into said holding means and upon deactivation of said first means is moved to said vertical position, where said slide is free to drop from said holding means.

8. The combination in accordance with claim 7 wherein said slide tray is provided with a plurality of slide compartments and wherein said means for registering said slide-handling mechanism above a slide compartment of a slide tray includes means for indexing said slide-handling mechanism to a particular slide compartment above which it is desired to register said slide-handling mechanism.

9. The combination in accordance with claims 4, 6, or 8 wherein said slide tray is provided with a plurality of numbers associated with said slide compartments and wherein said means for indexing includes a pointer so that one of said plurality of numbers on said slide tray opposite said pointer can be read when said slide-handling means is indexed to a particular slide compartment above which it is desired to register said slide-handling mechanism.

* * * * *